(12) United States Patent
Kakai

(10) Patent No.: US 7,513,724 B2
(45) Date of Patent: Apr. 7, 2009

(54) TOOL AND A DETACHABLE BODY FOR CHIP REMOVING MACHINING

(75) Inventor: Isak Kakai, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 230 days.

(21) Appl. No.: 11/407,334

(22) Filed: Apr. 20, 2006

(65) Prior Publication Data

US 2006/0257215 A1 Nov. 16, 2006

(30) Foreign Application Priority Data

May 2, 2005 (SE) .................................. 0501007

(51) Int. Cl.
*B23B 31/11* (2006.01)
(52) U.S. Cl. ............................ 409/234; 279/8; 408/233
(58) Field of Classification Search ................ 408/231, 408/232, 233, 238, 239 A, 239 R; 279/8; 409/232, 233, 234; 407/53, 54
See application file for complete search history.

(56) References Cited

U.S. PATENT DOCUMENTS

| | | | | |
|---|---|---|---|---|
| 1,407,335 A | * | 2/1922 | Reynolds et al. ............... 285/85 |
| 2,158,120 A | * | 5/1939 | Hirschberg .................. 175/417 |
| 2,289,583 A | * | 7/1942 | Malone ........................ 403/317 |
| 3,730,637 A | * | 5/1973 | Cellini .................... 408/239 R |
| 4,850,759 A | * | 7/1989 | Strand et al. ............. 408/239 A |
| 4,958,965 A | * | 9/1990 | Strand et al. ................. 408/226 |
| 5,496,137 A | * | 3/1996 | Ochayon et al. ............. 408/226 |
| 5,598,751 A | * | 2/1997 | Ochayon et al. ........... 76/108.6 |
| 5,851,094 A | * | 12/1998 | Strand et al. ................. 409/234 |
| 5,947,660 A | | 9/1999 | Karlsson et al. |
| 5,964,555 A | * | 10/1999 | Strand ......................... 409/234 |
| 5,971,673 A | * | 10/1999 | Berglund et al. ............ 408/1 R |
| 5,988,953 A | * | 11/1999 | Berglund et al. ............ 408/1 R |
| 6,494,648 B2 | * | 12/2002 | Harpaz ........................ 407/30 |
| 6,503,027 B2 | * | 1/2003 | Men ............................. 407/33 |
| 6,506,003 B1 | * | 1/2003 | Erickson ..................... 408/226 |
| 6,565,291 B2 | * | 5/2003 | Harpaz et al. ................. 407/53 |
| 6,582,164 B1 | * | 6/2003 | McCormick ................ 408/226 |
| 6,899,495 B2 | * | 5/2005 | Hansson et al. ............. 408/144 |
| 6,976,815 B2 | * | 12/2005 | Berglow et al. ............. 409/234 |
| 7,004,692 B2 | * | 2/2006 | Hecht ......................... 408/233 |

(Continued)

FOREIGN PATENT DOCUMENTS

EP 1 629 918 3/2006

(Continued)

*Primary Examiner*—Daniel W Howell
(74) *Attorney, Agent, or Firm*—Drinker Biddle & Reath LLP

(57) ABSTRACT

A cutting tool including a basic body having a geometrical center axis, a loose top having a rear male element, and a drawbar having a front part in which a coupling means is included, which by engagement in a coupling means of the male element of the loose top can transfer axial forces. The coupling means form an interface between the loose top and the drawbar. Each coupling means includes two axially separated ridges, a front ridge in the male element is between a front groove and a rear groove, the front groove being shallower than the rear groove such that the bottom thereof is situated at a greater radial distance from the center axis than the bottom of the rear groove.

17 Claims, 5 Drawing Sheets

U.S. PATENT DOCUMENTS

| | | | |
|---|---|---|---|
| 7,101,128 B2 * | 9/2006 | Hansson | 409/234 |
| 7,207,755 B2 * | 4/2007 | Berglow | 409/232 |
| 7,306,410 B2 * | 12/2007 | Borschert et al. | 408/144 |
| 7,309,196 B2 * | 12/2007 | Ruy Frota de Souza | 408/227 |
| 2001/0009636 A1 | 7/2001 | Men | |
| 2003/0210963 A1 * | 11/2003 | Kakai et al. | 408/231 |
| 2006/0051174 A1 * | 3/2006 | Pantzar et al. | 409/234 |
| 2006/0072977 A1 * | 4/2006 | Jonsson et al. | 408/233 |

FOREIGN PATENT DOCUMENTS

| | | |
|---|---|---|
| SE | 0402039 | 2/2006 |
| WO | 01/54849 | 8/2001 |
| WO | WO 02/14005 A1 | 2/2002 |
| WO | 2004/069457 | 8/2004 |

* cited by examiner

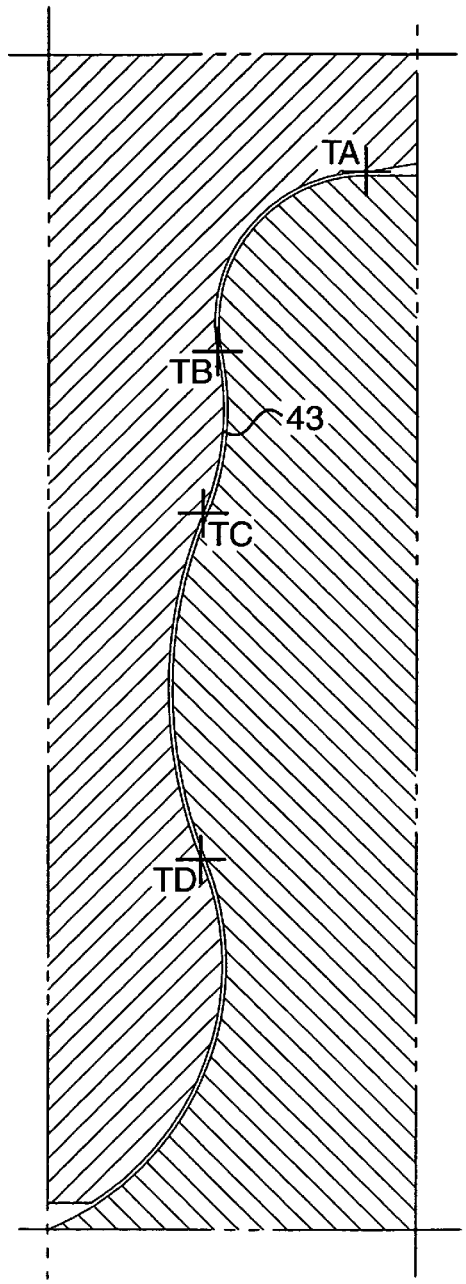
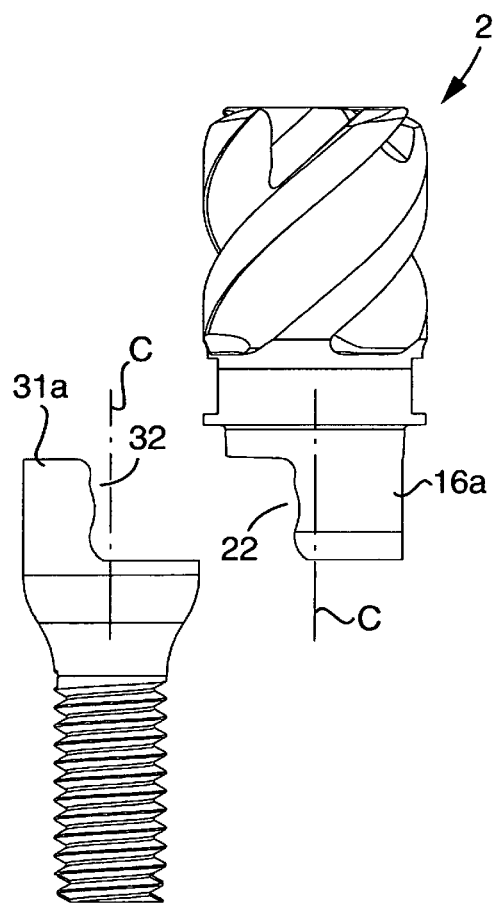
Fig 12
Fig 13

TOOL AND A DETACHABLE BODY FOR CHIP REMOVING MACHINING

This application claims priority under 35 U.S.C. § 119 to Swedish Patent Application No. 0501007-9, filed on May 2, 2005, the disclosure of which is incorporated by reference herein in its entirety.

FIELD OF THE INVENTION

The present invention relates generally to a tool for chip removing machining of the type that includes a basic body having a hole, which has a rotationally symmetrical basic shape defined by a geometrical center axis and opens into a front mouth, a detachable body having a front head and a rear male element, and a drawbar, which includes a rear part and a front part. The front part includes a first coupling that forms a mechanical engagement with a second coupling included in the male element of the detachable body, transferring axial forces between the drawbar and the detachable body. The male element of the detachable body is retractable into and projectable out of the hole of the basic body by the drawbar.

BACKGROUND OF THE INVENTION

Cutting tools of the type that make use of a basic body mountable in a machine or holder, as well as a separate, detachable body, such as a cutting body, may in practice be of the most varying form and not only be rotary tools, such as drills and milling cutters, but also turning tools. In modern machine tools, the basic bodies are so expensive that they, for economical reasons, cannot be integrated with the cutting body, which is a wear part and has a limited service life. In other words, it is profitable to make the proper cutting body in the form of a separate, replaceable unit, which by those skilled in the art usually is denominated "loose top", and which can be replaced after wear-out, while the basic body can be utilized for a longer time (usually 10 to 20 exchanges). Loose tops having chip-removing cutting edges are manufactured entirely or partly from hard, wear-resistant materials, such as cemented carbide or the like, while the basic bodies are made of a softer material, such as steel or the like. In rotary tools, such as drills and shafts having a cylindrical basic shape, the loose top is connected with the front end of the shaft via some form of interface.

The development of loosetop tools for rotary machining has resulted in a number of different designs for the interface between the loose top and the basic body. By, among others, WO 02/14005 A1, US 2001/0009636 A1 and WO 2004/069457 A1, small milling cutters have been presented in the form of shank end mills or profile mills, which make use of a drawbar, at the front end of which the loose top may be fastened and be drawn into an axial hole in a basic body in the form of a long narrow shaft. In the tool that is accounted for in the first-mentioned document, the loose top is connected with the drawbar via a threaded joint, while the tools according to the two last-mentioned documents make use of hook-shaped members having inclined contact surfaces in order to draw in and fix the loose top in a hole in the basic body. In contrast to such tools the basic bodies of which lack holes for drawing in the loose top (see, for example, U.S. Pat. No. 5,947,660 and U.S. Pat. No. 5,988,953), these tools have the advantage that a rear male element of the loose top is drawn into the hole in the basic body in order to, together with a front portion of the drawbar, be clamped inside a ring-shaped or sleeve-shaped portion of the basic body. Therefore, in such comparatively weak tools as shank end mills and profile mills, the basic bodies of which consist of comparatively slender shafts, a considerably more stable and more reliable anchorage of the cutting body is obtained than in case where the tool lacks holes in which parts of the loose top can be housed.

The fact that loosetop tools have been the object of a large number of proposals for design solutions is in itself evidence that the design of the interface between the loose top and the basic body is a technical problem difficult to master. Thus, consideration has to be given to a number of different factors, which are based not only on the fact that the loose top and the basic body/drawbar are manufactured from different materials and in production units separated from each other, but also on the fact that the tools should operate under severe external conditions, such as strong heat release, etc. In particular, such small tools as shank end mills and profile mills are subjected to a variety of different stresses, which vary most considerably in different functional states. Thus, the loose top, i.e., the hard, detachable cutting body in a profile mill, is subjected not only to axial tensile and compressive forces, respectively, but also to a variety of radial forces acting in different directions. Therefore, to form a working interface between a loose top and a basic body becomes in practice a delicate balance between a number of, at times, conflicting desires.

With the purpose of developing loosetop tools to a greater perfection, an interface acting between the loose top and the basic body has been proposed of the type that is accounted for in the previously filed Swedish patent application SE 0403039-2. In this case, at least one pair of co-operating so-called serration surfaces, which have a certain axial extension and the ridges and grooves of which extend perpendicularly to the longitudinal axis of the tool, are utilized as an interface between the loose top and a drawbar mounted in the basic body. In this way, the capability of the interface to transfer axial forces, such as tensile forces between the loose top and the drawbar, is improved in comparison with the previously known technique.

However, the tool disclosed in SE 0402039-2 is also impaired by imperfections. Thus, it has turned out that the detachable cutting body under certain circumstances risks breaking or being cracked, for example in the area of male elements that connect to the head of the cutting body. Another drawback is that of the shape of the serration surfaces not with absolute certainty prevents erroneous mounting of the cutting body in the front part of the drawbar.

In an embodiment, the present invention aims at further developing cutting tools of the type initially mentioned so far that the tool meets a large number of requirements, certain of which being conflicting. Therefore, an object of the invention is to provide a tool having an interface formed between the loose top and the drawbar, which in an optimal way resists varying external and internal forces acting in different directions in the interaction of forces that arises not only in connection with the operation of the tool, but also in connection with the mounting and dismounting of the loose top. Thus, the loose top should, in particular when the same consists of a cutting body from a hard material, be able to be subjected to axial tensile and compressive forces as well as radial or lateral forces, the action angles of which to the body may vary in a most irrational way. In particular, a cutting body made from cemented carbide should be able to resist external forces that in conventional, previously known tools frequently cause fracture in the area of the interface. Simultaneously, the internal stresses in such a cutting body should not become too demanding. On the other hand, the strength of the cutting body must not to too high an extent be gained at the expense of the strength and functionality in the drawbar. In other words, the drawbar must not be made so weak that fracture or fatigue arise in the proper drawbar. In an embodiment, the invention aims at providing a rotatable tool, for example a shank-end mill, which in its entirety is well balanced in order to be driven at high rotational speeds without giving rise to vibrations, with the ensuing difficulties, such as heat release and impaired machining precision. Another, object of an embodiment of the invention is to provide a tool that, in spite of good functionality, is easy to manufacture. In other words, it should be possible to produce the tool by means of a minimal number of working operations.

SUMMARY OF THE INVENTION

In contrast to the interface that is disclosed in the above-mentioned SE 0402039-2and that makes use of coupling means in the form of so-called serration surfaces, which are distinguished by the fact that the surfaces have a certain axial extension and individually includes conventionally conformal ridges and grooves, which extend transverse to the longitudinal axis of the tool, and embodiment of the present invention is based on the idea of, in the individual coupling means, using two ridges and grooves, respectively, which are of different sizes, i.e., have different height and depth, respectively. Advantageously, the ridges and the grooves are furthermore given a shape that radically deviates from the shape that is recognized for conventional so-called serration ridges and that is characterized by fairly steep flank angles and a limited width.

In an embodiment, the invention provides a tool for chip removing machining, including a basic body, a detachable body, and a drawbar. The basic body includes a rotationally symmetrical basic shape disposed about a geometrical center axis, and defines a hole terminating in a front mouth. The detachable body includes a front head and a rear male element having a first coupling means. The drawbar includes a rear part and a front part. The front part has a second coupling means to form a mechanical engagement with the first coupling means and to transfer axial forces between the drawbar and the detachable body. The male element of the detachable body is retractable into and projectable out of the hole by the drawbar. Each of the first and second coupling means includes two axially spaced ridges, a front ridge of the male element being between a first groove proximate the head of the detachable body and a second groove that transitions to a rear ridge of the male element, the first groove being shallower than the second groove such that the bottom of the first groove is disposed at a greater radial distance from the center axis than the bottom of the second groove. A first groove of the second coupling means is between a front ridge and a rear ridge of the second coupling means, and a second groove of the second coupling means is axially rearward of the rear ridge of the second coupling means.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 12 is an enlarged detailed section of the interface of FIG. 10; and

FIG. 13 is a an exploded view illustrating an alternative embodiment of the tool according to the invention.

DETAILED DESCRIPTION OF THE PREFERRED EMBODIMENTS

Figure 1:
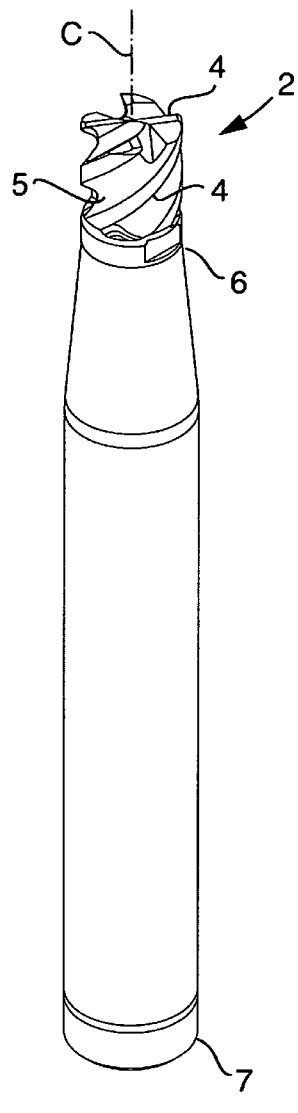
FIG. 1 is a perspective view of a cutting tool according to an embodiment of the invention in the form of a shank-end mill.
Figure 2:
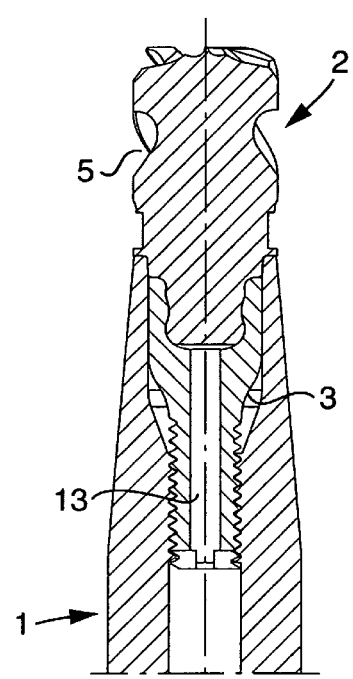
FIG. 2 is an enlarged, partial longitudinal section of the tool of FIG. 1, showing a basic body, a drawbar and a detachable body in the form of a cutting body (cutter head)
Figure 3:
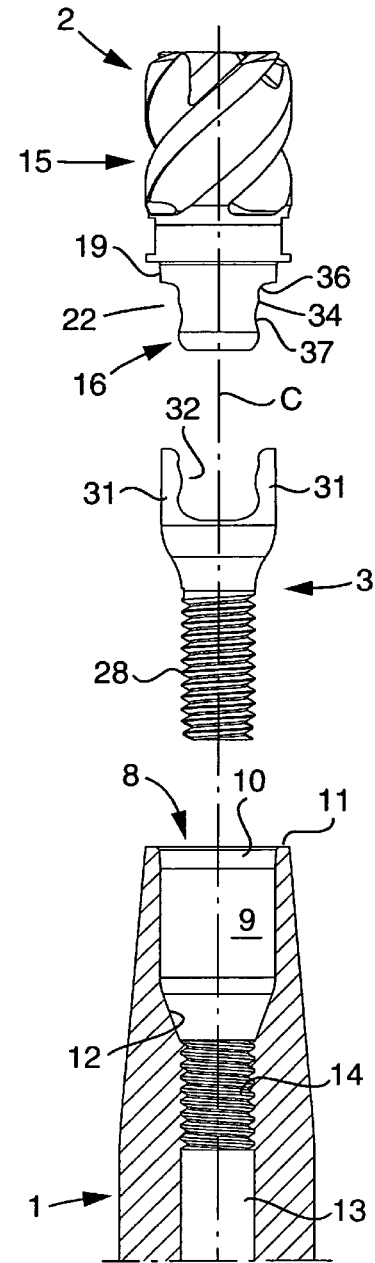
FIG. 3 is a an exploded view showing the same components as in FIG. 2.

In FIGS. 1-3, a tool intended for chip removing machining is shown, which is exemplified in the form of a shank-end mill. The tool includes three main components, in particular a basic body 1, a detachable body 2, and a drawbar 3. In the example, the basic body 1 is in the form of a long narrow shaft having a cylindrical basic shape. A through geometrical center axis through the tool is designated C. Along the center axis, not only the basic body 1 extends, but also the drawbar 3 and the detachable body 2, and therefore the designation C will henceforth also be used in order to denote the geometrical center axis for each one of the three components.

In the example shown, the detachable body 2 is a cutter head, which in a conventional way includes chip-removing cutting edges 4, as well as chip flutes 5, and which is manufactured from a hard material, such as cemented carbide. By those skilled in the art, this component is denominated "loose top"; a denomination which henceforth will be used in order to allude to the body that can be mounted in the basic body by means of the drawbar.

It is also pointed out that the basic body 1 and the drawbar 3 usually are manufactured from steel or from some other material that is "softer" than the hard material in the loose top 2.

A front end of the basic body 1 is designated 6, while a rear end is designated 7. As is illustrated in FIG. 3, a hole 8 is formed in the front end of the basic body, which hole has a rotationally symmetrical shape, defined by the center axis C. More precisely, the hole is delimited by a cylindrical surface 9, as well as a slightly conical surface 10 in connection with the front mouth, which is delimited by a ring-shaped, planar shoulder surface 11 extending perpendicularly to the center axis C. Via a tapering transition surface 12, the hole 8 transforms into a more slender hole section 13, which at the front end thereof is formed with a female thread 14. The hole section 13 extends axially all through the basic body 1 and opens in the rear end 7.

Figure 4:
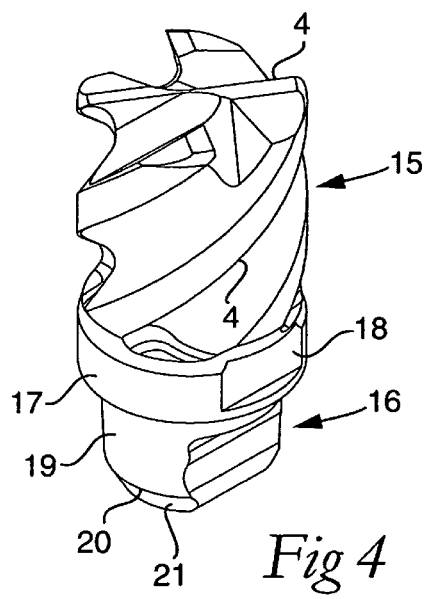
FIG. 4 is an enlarged perspective view of the proper cutting body.
Figure 5:
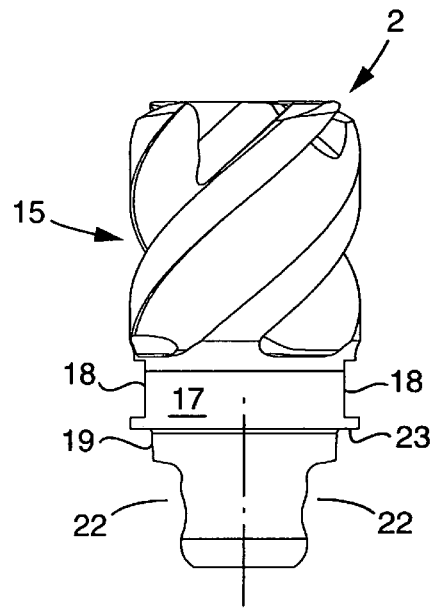
FIG. 5 is a side view of the cutting body of FIG. 4.

Now reference is made also to FIGS. 4 and 5, which illustrate the design of the loose top 2. Loose top 2 includes a front head 15 and a rear male element 16, which is spaced apart from the head 15 via a transition portion 17, the peripheral surface of which has a cylindrical basic shape. On diametrically opposed sides, the transition portion is, however, formed with two planar surfaces 18, which are parallel to each other and serve as a key grip in order to allow rotation of the loose top.

A large part of the male element 16 is delimited by a rotationally symmetrical surface 19, which is slightly conical. For instance, the cone angle may amount to 5° (2×2.5°). Via a rear turning line 20, the cone surface 19 transforms into a second cone surface 21 having a considerably larger cone angle, for instance 60° (2×30°). In two diametrically opposed areas, the generally rotationally symmetrical male element 16 is formed with recesses, which are delimited by surfaces 22, which are facing away from each other and serve as coupling means for co-operation with corresponding coupling means in the drawbar. The nature of these coupling means 22 will be described in more detail below, reference being made to FIGS. 8-12. Concerning the loose top 2 in other respects, it is pointed out that the chip-removing cutting edges 4 are not only radial edges at the front end of the head 15, but also of one of the two edges that define each chip flute 5. Furthermore, it is noted that the recesses for the provision of the coupling means 22 are axially somewhat shorter than the male element in its entirety. This means that the cone surface 19 extends circumferentially endlessly, i.e. without interruption, in the area closest to the transition portion 17 of the loose top. Furthermore, the cone surface 19 has a largest diameter that is considerably smaller than the diameter of the transition portion 17, which means that a ring-shaped support surface 23 projects radially in relation to the cone surface 19. This support surface 23 is planar and is located perpendicularly to the center axis C in order to be pressed against the shoulder surface 11 of the basic body 1.

Figure 6:
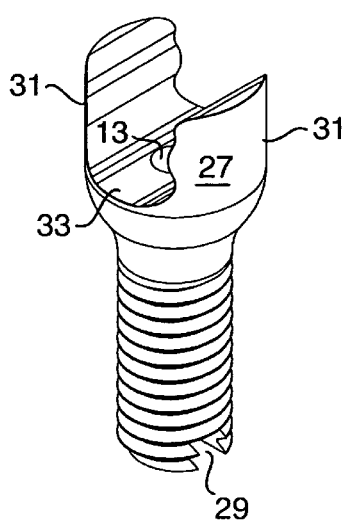
FIG. 6 is an enlarged perspective view of the drawbar.
Figure 7:
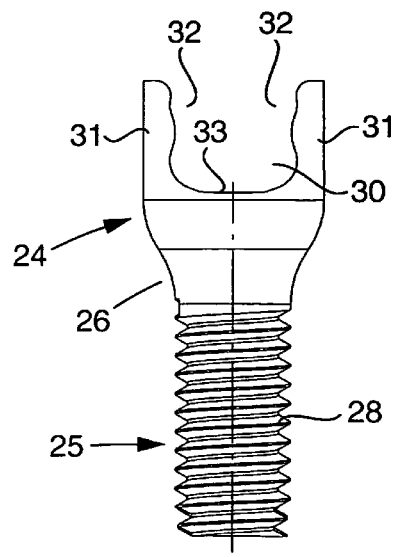
FIG. 7 is a side view of the drawbar of FIG. 6.

As illustrated in FIGS. 6 and 7, the drawbar 3 includes a front, fork-like part 24, as well as a more slender, rear part 25, which is spaced apart from the front part via a tapering waist 26. Externally, the drawbar 3 has a rotationally symmetrical basic shape so far that the external surface 27 is cylindrical. Also the rear part 25 has a cylindrical, pin-like shape, although the same is formed with a male thread 28 along the entire length thereof. The waist 26 is generally conical, although the same is delimited by an upper, convexly curved surface portion, as well as a lower, concavely curved surface portion. As illustrated in FIG. 6, the rear end of the drawbar is formed with a key grip 29 in the form of a groove. In the front part 24 of the drawbar, a seat or space 30 is formed, which is delimited by two diametrically opposed side pieces 31 having identical shape. The inner sides of the side pieces 31 are formed as coupling means 32 for co-operation with the coupling means 22 of the loose top. Between the side pieces, a bottom designated 33 extends.

Figure 8:
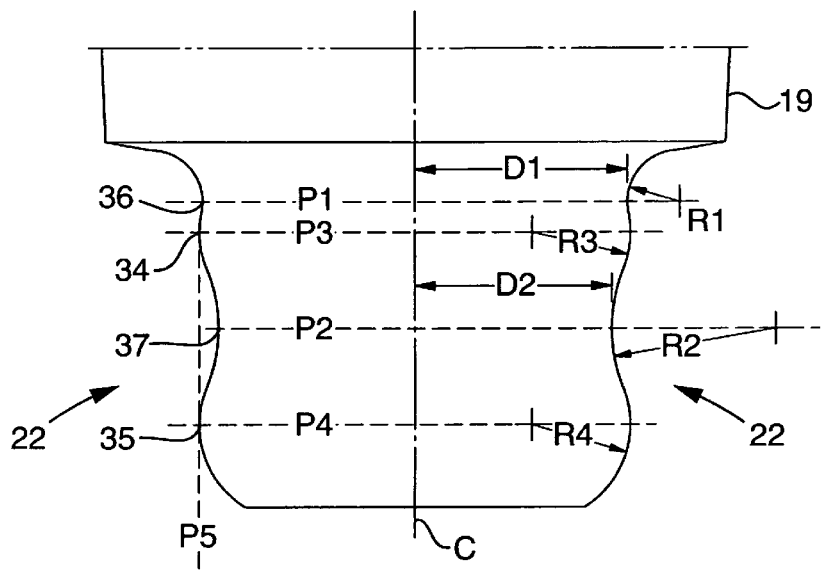
FIG. 8 is an enlarged, schematic view illustrating the geometrical shape of a rear male element included in the cutting body.

Reference is now made to FIGS. 8-12, which in detail illustrate the design of the co-operating coupling means 22, 32 in the male element 16 of the loose top and the front, fork-like part 24 of the drawbar, respectively. As illustrated in FIG. 8, the male element on each one of the opposite sides thereof has two ridges 34, 35, the first-mentioned one of which is located closest to the thick head (see the cone surface 19) of the loose top, while the second one is located in the area of the rear end of the male element 16. In connection with the ridges 34, 35, there are grooves or countersinks 36, 37, a front one 36 of which is situated between the front ridge 34 and the head of the loose top, while a rear one 37 is situated between the ridges 34, 35. In this connection, it should be mentioned that the rear end of the male element is formed by a surface, the shape of which is incidental. However, in the example, the end surface is planar and extends perpendicularly to the center axis C.

Also the individual coupling means 32, which is formed on the inner side of each side piece 31, includes a pair of ridges 38, 39 as well as a pair of grooves 40, 41. A front ridge 38 is situated in the immediate proximity of the free end surface 42 of the side piece 31, and separated from the rear ridge 39 via the front groove 40. The rear groove 41 is situated between the ridge 39 and the bottom 33 of the seat 30.

It is pointed out that the contour shape or topography of the left side of the male element 16 is identical to the topography of the right side. For this reason, reference designations have been marked only on the left side. The same relation applies for the coupling means 32 of the drawbar.

In FIG. 8, P1 designates an imaginary plane, which extends perpendicularly to the center axis C and in which the front grooves 36, more precisely the bottoms in the same, are situated. In an analogous way, P2 designates a plane being common to the grooves 37. P3 designates a plane in which the crests or crest lines of the front ridges 34 are jointly situated. A corresponding plane of the crest lines of the rear ridges 35 is designated P4.

Characteristic of an embodiment of the invention is that the front groove 36, situated closest to the head of the loose top, in the respective coupling means is shallower than the rear groove 37, so that the bottom or bottom line of the groove 36 is situated at a greater radial distance DI from the center axis C than the bottom of the rear groove 37 (see the distance D2). Because the ridges 38, 39 of the coupling means 32 fit into the grooves 36, 37 of the coupling means 22, the crest of the individual ridge 38 is also situated at a greater radial distance D3 from the center axis C than the crest of the ridge 39 (see the distance D4 in FIG. 9).

Figure 11:
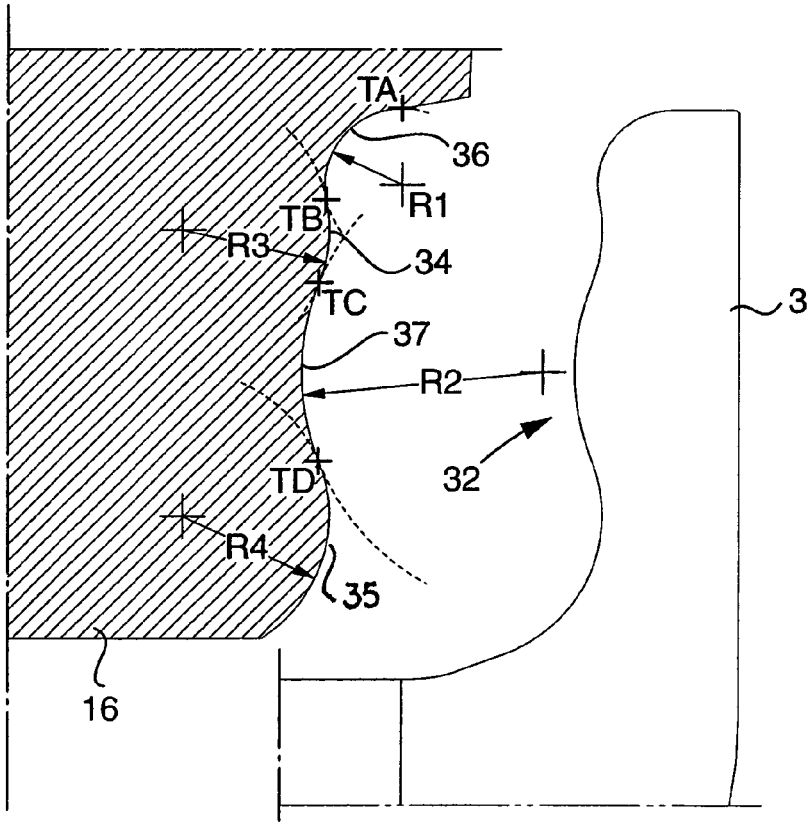
FIG. 11 is an enlarged detailed section showing the male element and the drawbar in a separated state.

Although the shape of the described ridges and grooves may be varied within the scope of the invention, it is preferred to endow the same at least a partially curved shape, as is illustrated in the Figures. Hence, in the preferred embodiment, the individual ridge is at least partially delimited by a convexly curved surface, while the individual groove is delimited by a concavely curved surface. Advantageously, all surfaces are part-cylindrical by being defined by radii of imaginary circular cylinders. In the example, all ridges and grooves are in their entirety delimited by curved surfaces, nearby convex and concave surfaces transforming into each other via tangents. This is illustrated in FIG. 11, which shows how the front groove 36 consists of a concavely curved surface, which extends between the tangential points (or lines) TA, TB. The front ridge 34 of the male element 16 includes a convex, part-cylindrical surface, which extends between the tangential point TB and a tangential point designated TC. Furthermore, the rear groove 37 consists of a concavely curved surface between the tangential point TC and a tangential point TD, in which the groove transforms into a convexly curved, likewise part-cylindrical surface, which defines the rear ridge 35.

Figure 10:
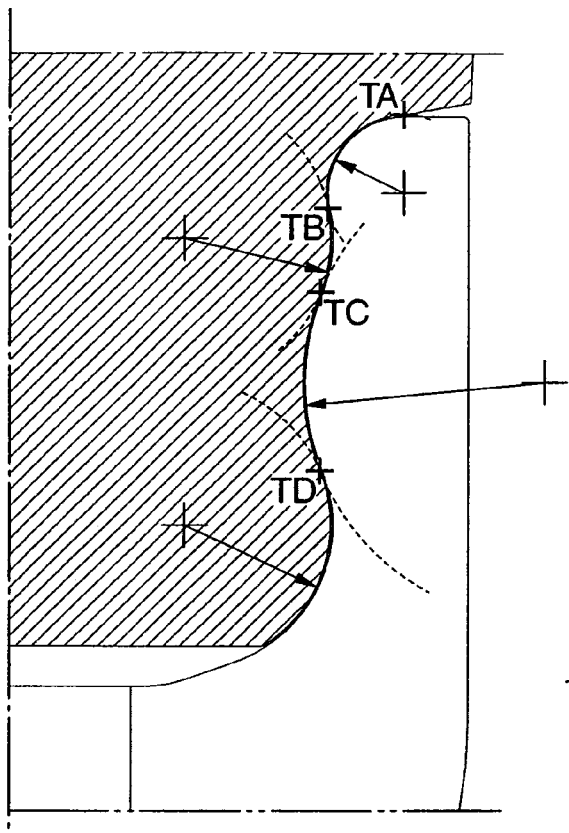
FIG. 10 is an enlarged detailed section showing an individual interface between the male element and the drawbar in a connected state.

Since the different curved surfaces included in the coupling means 32 (see FIG. 11) transform into each other via tangential points situated in the same axially separated plane as the tangential points in the coupling means 22, these tangential points have not been marked in FIG. 11. However, as illustrated in FIG. 10, these tangential points coincide when the male element 16 is inserted into the seat 30.

It is pointed out that, in the example, the different surfaces of the coupling means are straight, so far that generatrices along the surfaces are straight, and perpendicular to the plane of the drawing. This means that moving of the male element into and out of the seat 30 takes place by a straight, translational motion in the direction perpendicular to the plane of the drawing.

Now reference is made again to FIGS. 8 and 9, in which R1 and R2 designate the radii of the front and rear grooves 36, 37 of the male element 16. In an analogous way, the radii of the ridges 34, 35 are designated R3 and R4, respectively. As has been indicated above, the grooves 36, 37 have the deepest situated bottoms or bottom lines thereof located in the planes P1, P2, while the crests or crest lines of the ridges 34, 35 situated farthest from the center axis C are located in the planes P3 and P4, respectively. As is further seen in FIG. 8, the crest lines of the ridges 34, 35 are situated in a common plane P5, which is parallel to the center axis C and perpendicular to the plane of the drawing. In other words, the distance between the crest line of the ridge 34 and the center axis C is equally great as the distance between the crest line of the ridge 35 and the center axis C.

In an analogous way, the bottoms of the grooves 40, 41 are tangent to a common plane P6, which is parallel to the center axis C and perpendicular to the plane of the drawing. In other words, the bottoms of the grooves are situated at equally great distances from the center axis C. The radii R3, R4 of the ridges 34, 35 are (but do not need to be) equally large, while the radii R1, R2 of the grooves 36, 37 are of different sizes. The fact that the groove 37 is deeper than the groove 36, i.e., that the distance D2 is smaller than the distance DI, is a consequence of the fact that the concave surface that defines the groove 37 has been given a greater axial extension than the concave surface that defines the groove 36. This is clearly illustrated in FIG. 11, which shows how the axial distance between the tangential points TC and TD is considerably greater than the corresponding distance between the tangential points TA and TB.

In the illustrated embodiment, which relates to a shank-end mill having a diameter of 12 mm (the diameter of the head 15), the radii of curvature R3, R4 of the ridges 34, 35 of the male element 16 amount to 1.5 mm, while the radius R1 of the groove 36 amounts to 0.8 mm, and the radius R of the groove 37 to 2.5 mm.

Figure 9:
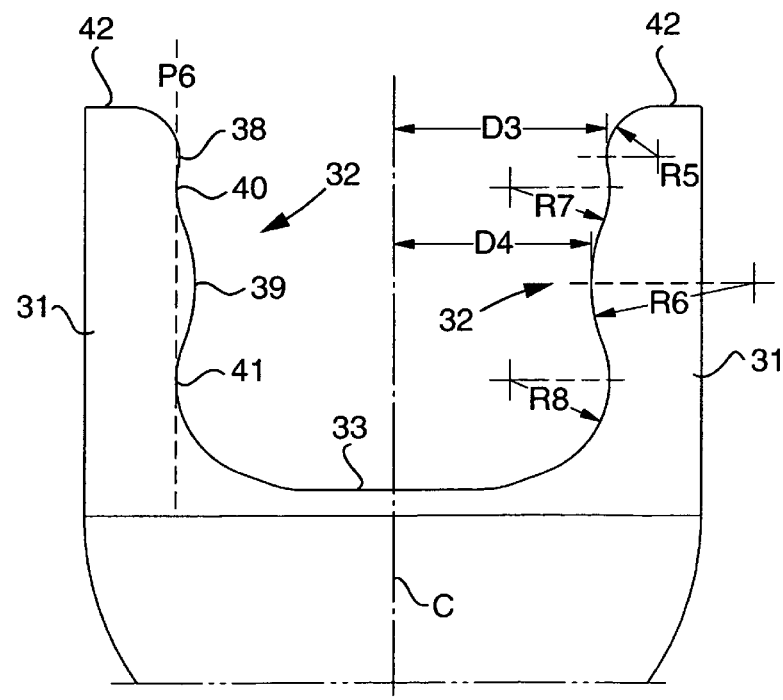
FIG. 9 is a schematic view showing the geometrical shape of a front part of the drawbar.

In FIG. 9, R5 and R6 designate the radii of the ridges 38, 39, while R7, R8 designate the radii of the grooves 40, 41. In theory, it would be feasible that the radii R5, R6 of the ridges 38, 39 exactly correspond to the radii R1, R2 of the grooves 36, 37 (and the radii R7, R8 to the radii R3, R4). However, in practice, this is not possible in that the male element 16 then would need to be inserted in the seat 30 by an extremely fine fit. In practice therefore, the ridges 38, 39 are given radii R5, R6 that are somewhat smaller than the radii R1, R2 of the grooves 36, 37. Simultaneously, the grooves 40, 41 are given radii R7, R8 that are somewhat larger than the radii R3, R4 of the ridges 34, 35. In an embodiment, these radius differences may amount to at least 0.01 mm and at most 0.05 mm The result of these radius differences is clearly illustrated in FIG. 12, which shows how a play 43 of one or a few hundredths of a millimeter arises when the male element 16 is inserted into the seat 30.

Before the function of the described tool is described in detail, with reference to FIG. 3, it is pointed out that the external cone surface 19 of the loose top 2 serving as a guide surface has a diameter (mean diameter) that is somewhat larger than the diameter of the internal cone surface 10 in the basic body. This difference in diameter may be as small as 0.002-0.02 mm, but still guarantee a strong prestress between the surfaces 10, 19 when the loose top is mounted in the basic body.

Upon mounting of the loose top 2 in the basic body 1, a first measure is to introduce the male element 16 of the loose top from the side into the seat 30 in the front part of the drawbar 3. After this, the drawbar is introduced into the hole 8 and fastened with the male thread 28 thereof in engagement with the female thread 14. Initially, this may be effected just manually, i.e., without tools. However, when the loose top 2 begins approaching the front end of the basic body, a tool (not shown) has to be used, which is applied against the key grip formed by the planar surfaces 18. By means of this tool, the loose top can be drawn in into an end position in which the ring-shaped support surface 23 is pressed against the shoulder surface 11. During the final phase of this operation, the surfaces 19, 10 will contact each other, the sleeve-shaped or ring-shaped material portion in the front end of the basic body being subjected to a prestress due to the above-mentioned diameter difference. More precisely, the front portion of the male element 16 is pinched by the elastically resilient material (steel) in the front material portion in connection with the cone surface 10. In other respects, the cylindrical section 9 of the hole 8 is filled up by the two side pieces 31 of the drawbar in that the external cylindrical surfaces 27 of the same are kept by a fine fit in contact with the likewise cylindrical, internal surface 9. In other words, the loose top as well as the drawbar are fixed in an utmost stable and reliable way in the basic body.

Exchange of the loose top can be carried out without the drawbar 3 needing to be removed from the basic body. Thus, the drawbar may—by means of a tool applied to the key grip 18—be unscrewed so far that the bottom 33 of the seat 30 slightly passes the shoulder surface 11. After this, the loose top is free to be drawn out sidewards and be replaced by a new loose top, which in turn is anchored in the way described above in the position shown FIGS. 1 and 2.

A substantial advantage of the tool according to an embodiment of the invention is that the part of the loose top being most sensitive to the influence of external forces that tend to shear off or break up the loose top, in particular the front portion of the male element that is delimited by the front grooves (see the plane P1) obtains optimum strength, without for that reason intrude on the strength and capacity of the drawbar to transfer tensile forces to the loose top in connection with the mounting and fixation thereof. Thus, the rear and biggest ridges in the coupling means of the drawbar have a retained, good force-transmission capacity in the axial direction. The bigger ridges engage the deepest grooves of the male element in the least sensitive area of the male element, in particular in the rear portion that is situated deeply down in the hole of the basic body and therefore less subjected to so large shear and bending loads as the portion situated closer to the head of the loose top. Another advantage is that the mounting of the loose top in connection with exchange becomes foolproof. Due to the difference in shape between the front and rear ridges and grooves, respectively, the male element of the loose top can accordingly not be mounted in the wrong way in the seat of the drawbar by possible attempts to bring in the rear ridges of the male element in the front grooves of the seat. Furthermore, the embodiment exemplified in the Figures is particularly advantageous so far that all ridges and grooves are delimited by curved, smoothly and flatly rounded surfaces, which completely lack any form of sharp or angular transition that could serve as an indication of fracture. Furthermore, in practice, the active contact between co-operating surfaces should become considerably better than if the contact would be realized by means of planar contact surfaces, because planar contact surfaces demand a precision not achievable in practice in order not to give only line or point contact.

In FIG. 13, an alternative embodiment of the invention is shown. In this case, the loose top 2 includes only a single coupling means 22, which co-operates with a single coupling means 32 in the drawbar 3. The proper design of the coupling means or surfaces is identical to the one described above. However, as is clearly illustrated in FIG. 13, the surfaces in question are located in axial planes, which are displaced laterally in relation to the center axis C. More precisely, the coupling means 22 is located in such a way that the male-like element 16a of the loose top becomes bigger than the side piece 31 a included in the drawbar 3 and on which the coupling means or surface 32 is present. In other respects, the embodiment illustrated in FIG. 13 is analogous to that described previously.

The invention is not limited only to the embodiments described above and shown in the Figures. Although the described interface between the drawbar included in the basic body and a body connectable with the drawbar is particularly suitable for the fixation of cutting bodies or loose tops of cemented carbide, the interface may also be used for the mounting of other detachable bodies, for example extension bodies and the like. It is also pointed out that the invention can be applied to tools other than rotary tools. In particular, the invention could be applied to such relatively slender or thin tools that are used for parting or grooving operations. Concerning the possibilities of modifying the geometrical shape of the described coupling means, it is pointed out that the ridges and the grooves in the same neither need to be straight nor continuous. Thus, the ridges and the grooves may be made having a shape being curved in the horizontal plane. Accordingly, instead of being defined by straight generatrices, the same may be defined by circular arc-shaped generatrices, the loose top having to be turned in connection with the insertion in the seat of the drawbar. Neither need the ridges and the grooves, respectively, to extend at a right angle to the center axis. Thus, within the scope of the invention the ridges/grooves may be tilted at a certain, acute angle to the axis, for instance within the range of 70-90°. In the last-mentioned case, the coupling between the loose top and the drawbar could be made in such a way that the male element of the loose top can be inserted only from one side of the seat in order to, in an end position, be centered in the same. It is also possible to construct, for example, an individual ridge with a depression in the area between the two opposite ends thereof. In such a way, two separated part flank surfaces would be established instead of a single continuous flank surface. The same possibility applies also to the individual groove. Furthermore, it is possible to form the interface with means, for example snap means, which automatically center the loose top in the drawbar, also in case this is not tightened in the basic body. Furthermore, it is possible to make the drawbar in another way than having a threaded rear body. Thus, for the purpose of drawing in the loose top into the basic body, also other solutions may be used. Another possibility of modifying the tool is to form the loose top with one or more ducts for cooling liquid. In conclusion, it is pointed out that the concept "head" is used in the preceding description to denote the front part of the detachable body protruding from the basic body. If the detachable body would be something else than a cutting body, for example an extension detail, this is of no importance to the design of the interface. In other words, the concept "front head" should be interpreted in its widest sense.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A tool for chip removing machining, comprising: a basic body having a hole, which has a rotationally symmetrical basic shape defined by a geometrical center axis, and opens in a front mouth; a detachable body having a front head and a rear male element; and a drawbar, which includes a rear part and a front part in which a first coupling means is included to, by a mechanical engagement with a second coupling means included in the male element of the detachable body, transfer axial forces between the drawbar and the detachable body, the male element of the detachable body being retractable into and projectable out of said hole by means of the drawbar, wherein each one of the two coupling means includes two axially separated ridges which extend at an angle to the center axis, a front ridge being formed in the male element of the detachable body between a first groove proximate the head of the detachable body and a second groove connecting to a rear ridge, the first groove being shallower than the second groove such that a bottom thereof is located at a greater radial distance from the center axis than a bottom of the second groove, and a first groove in the first coupling means being situated between a front and a rear ridge of the first coupling means, while a second groove is situated behind the rear ridge of the first coupling means, wherein bottoms of respective grooves and crests of respective ridges are situated in respective imaginary planes which are perpendicular to the center axis.

2. The tool according to claim 1, wherein the ridges are at least partially delimited by a convexly curved surface, and the grooves by a concavely curved surface.

3. The tool according to claim 2, wherein said surfaces are part-cylindrical by being defined by radii of imaginary cylinders.

4. The tool according to claim 2, wherein adjacent convex and concave surfaces transform directly into each other via tangents.

5. The tool according to claim 1, wherein the second groove of the detachable body has a greater axial extension than the first groove of the detachable body.

6. The tool according to claim 1, wherein crests or crest lines of the two ridges included in the second coupling means of the male element are situated in an imaginary, common plane, which is parallel to the center axis.

7. The tool according to claim 1, wherein a topography of the first and second coupling means, as determined by a profile shape of the ridges and of the grooves in cross-section, is substantially identical.

8. The tool according to claim 1, wherein radii of curvature of the two ridges included in the second coupling means of the detachable body are smaller than radii of curvature of co-operating grooves in the first coupling means of the drawbar, and the two ridges of the first coupling means of the drawbar have radii of curvature that are smaller than radii of curvature of co-operating grooves in the second coupling means of the detachable body.

9. The tool according to claim 8, wherein the radius differences amount to at least 0.01 mm and at most 0.05 mm.

10. A tool for chip removing machining, comprising: a basic body having a hole, which has a rotationally symmetrical basic shape defined by a geometrical center axis, and opens in a front mouth; a detachable body having a front head and a rear male element; and a drawbar, which includes a rear part and a front part in which a first coupling means is included to, by a mechanical engagement with a second coupling means included in the male element of the detachable body, transfer axial forces between the drawbar and the detachable body, the male element of the detachable body being retractable into and projectable out of said hole by means of the drawbar, wherein each one of the two coupling means includes two axially separated ridges which extend at an angle to the center axis, a front ridge being formed in the male element of the detachable body between a first groove proximate the head of the detachable body and a second groove connecting to a rear ridge, the first groove being shallower than the second groove such that a bottom thereof is located at a greater radial distance from the center axis than a bottom of the second groove, and a first groove in the first coupling means being situated between a front and a rear ridge of the first coupling means, while a second groove is situated behind the rear ridge of the first coupling means, wherein the male element is formed with two opposite first coupling surfaces facing away from each other, which are arranged to co-operate with second coupling surfaces facing each other on an inner side of two separated side pieces included in the front part of the drawbar, the male element being insertable sideways in a seat delimited between said side pieces.

11. A detachable body for tools for chip removing machining, comprising: a front head and a rear male element, which extend along a common center axis, the male element including a mechanical coupling means having male and female engagement members, wherein the engagement members of the coupling means includes at least two axially separated ridges which extend at an angle to the center axis, a front ridge being between a first groove proximate said head and a second groove connecting to a rear ridge, the first groove being shallower than the second groove such that a bottom thereof is located at a greater radial distance from the center axis than a bottom of the second groove, wherein bottoms of respective grooves and crests of respective ridges are situated in respective imaginary planes which are perpendicular to the center axis.

12. The body according to claim 11, wherein the ridges are at least partially delimited by a convexly curved surface, and the grooves by a concavely curved surface.

13. The body according to claim 12, wherein the surfaces are part-cylindrical by being defined by radii of imaginary cylinders.

14. A detachable body for tools for chip removing machining, comprising: a front head and a rear male element, which extend along a common center axis, the male element including a mechanical coupling means having male and female engagement members, wherein the engagement members of the coupling means includes at least two axially separated ridges which extend at an angle to the center axis, a front ridge being between a first groove proximate said head and a second groove connecting to a rear ridge, the first groove being shallower than the second groove such that a bottom thereof is located at a greater radial distance from the center axis than a bottom of the second groove, wherein the ridges are at least partially delimited by a convexly curved surface, and the grooves by a concavely curved surface, and wherein adjacent convex and concave surfaces transform into each other via tangents.

15. A detachable body for tools for chip removing machining, comprising: a front head and a rear male element, which extend along a common center axis, the male element including a mechanical coupling means having male and female engagement members, wherein the engagement members of the coupling means includes at least two axially separated ridges which extend at an angle to the center axis, a front ridge being between a first groove proximate said head and a second groove connecting to a rear ridge, the first groove being shallower than the second groove such that a bottom thereof is located at a greater radial distance from the center axis than a bottom of the second groove, wherein the second groove has a greater axial extension than the first groove.

16. A detachable body for tools for chip removing machining, comprising: a front head and a rear male element, which extend along a common center axis, the male element including a mechanical coupling means having male and female engagement members, wherein the engagement members of the coupling means includes at least two axially separated ridges which extend at an angle to the center axis, a front ridge being between a first groove proximate said head and a second groove connecting to a rear ridge, the first groove being shallower than the second groove such that a bottom thereof is located at a greater radial distance from the center axis than a bottom of the second groove, wherein crests of the at least two ridges are situated in an imaginary, common plane, which is parallel to the center axis.

17. A tool for chip removing machining, comprising:
a basic body having a rotationally symmetrical basic shape disposed about a geometrical center axis, the basic body defining a hole terminating in a front mouth;
a detachable body including a front head and a rear male element, the rear male element having a detachable body coupling means; and
a drawbar including a rear part and a front part, the front part having a drawbar coupling means to form a mechanical engagement with the detachable body coupling means and to transfer axial forces between the drawbar and the detachable body, the male element of the detachable body being retractable into and projectable out of the hole by the drawbar;
wherein each of the detachable body and drawbar coupling means includes two axially spaced ridges, a front ridge of the male element being between a first groove proximate the head of the detachable body and a second groove that transitions to a rear ridge of the male element, the first groove being shallower than the second groove such that a bottom of the first groove is disposed at a greater radial distance from the center axis than a bottom of the second groove; and
wherein a first groove of the drawbar coupling means is between a front ridge and a rear ridge of the drawbar coupling means, and a second groove of the drawbar coupling means is axially rearward of the rear ridge of the drawbar coupling means; and
wherein bottoms of respective grooves and crests of respective ridges are situated in respective imaginary planes which are perpendicular to the center axis.

* * * * *